3,646,039
Patented Feb. 29, 1972

3,646,039
4,5-DIHYDROTHIENO[2,3-b][1]BENZOTHIEPIN DERIVATIVES AS CNS DEPRESSANTS
Walter Schindler, Riehen, near Basel, and Armin Zust, Birsfelden, near Basel, Switzerland, assignors to Geigy Chemical Corporation, Ardsley, N.Y.
No Drawing. Filed June 10, 1969, Ser. No. 832,011
Claims priority, application Switzerland, June 20, 1968, 9,211/68; Dec. 23, 1968, 19,149/68
Int. Cl. C07d 51/70
U.S. Cl. 260—268 TR          7 Claims

ABSTRACT OF THE DISCLOSURE

1 - [2 - or 1-[3-[4-(4,5-dihydrothieno[2,3-b][1]benzothiepin - 4 - yl)-1-piperazinyl]-alkyl]-3-alkyl-2-imidazolidinones and the pharmaceutically acceptable acid addition salts thereof which compounds exhibit depressant activity on the central nervous system; pharmaceutical compositions comprising these compounds and their salts as aforesaid and methods of producing central nervous system depressant effects in mammals which comprise administering an effective amount of a compound according to the invention or a pharmaceutically acceptable acid addition salt thereof; an illustrative embodiment is 1-[2-[4 - (4,5 - dihydrothieno[2,3-b][1]benzothiepin-4-yl)-1-piperazinyl]-ethyl]-3-methyl-2-imidazolinone.

DETAILED DISCLOSURE

The present invention relates to imidazolidinone derivatives, processes for their production, pharmaceutical compositions containing these compounds and the use thereof.

More particularly, the present invention relates to 1-[2- or 1 - [3-[4-(4,5-dihydrothieno[2,3-b]benzothiepin-4-yl) - 1 - piperazinyl]-alkyl]-3-alkyl-2-imidazolidinones of the Formula I

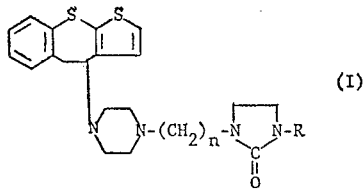

wherein

R is alkyl having from 1 to 6 carbon atoms and
n is 2 or 3 and pharmaceutically acceptable acid addition salts thereof.

As alkyl, R can be the methyl, ethyl, propyl, isopropyl, butyl, isobutyl, sec.butyl, tert.butyl, pentyl, 2-methylbutyl, isopentyl, 2,2-dimethylpropyl, 1-methylbutyl, 1-ethylpropyl, 1,2-dimethylpropyl, tert.pentyl group or the n-hexyl group.

It has now been found that the aforementioned compounds have a marked central nervous system depressant effect in mammals on oral, rectal or parenteral administration, e.g. they reduce motility, potentiate anesthesia and exhibit hypnotic action. They prevent reflexes, have a transquilising effect on the fighting mouse and also exhibit antihistaminic action and sympathicolytic activity.

Furthermore, they exhibit anti-emetic and hypothermic action. In comparison with the central depressant properties, the new compounds have a small cataleptic inherent action. They are also effective in the "test de la traction".

Accordingly, the present invention provides, in a further aspect, a pharmaceutical composition comprising an effective amount of a compound of the Formula I or a pharmaceutically acceptable acid addition salt thereof together with an inert pharmaceutical carrier therefor, as well as a method for producing central nervous system depressant effects in mammals which comprises administering to said mammal an effective amount of such a compound or pharmaceutically acceptable acid addition salt thereof. Administration is e.g. oral, rectal or parenteral.

The pharmacological properties of the inventive compounds and salts can be determined by selected standard tests [cp. R. Domenjoz and W. Theobald, Arch. Int. Pharmacodyn. 120, 450 (1959); W. Theobald et al., Arch. Int. Pharmacodyn. 148, 560 (1946) and W. Theobald et al., Arzneimittelforsch. 17, 561 (1967] and characterise them as being suitable for the treatment of states of tension, agitation and hypernemesis. These tests also characterise the inventive compounds as being highly suitable for use as hypnotics.

For example, on intraperitoneal administration of about 0.33 mg./kg. of 1 - [2-[4-(4,5-dihydrothieno[2,3-b][1]-benzothiepin - 4-yl) - 1 - piperazinyl]-ethyl]-3-methyl-2-imidazolidinone bis-methane sulfonate to mice, the spontaneous orientation motility is found to decrease to a considerable extent. The same compound, administered in amounts of about 0.08 mg./kg. subcutaneously to mice, prevents a considerable percentage of the animals, hanging on to a wire with their front paws, from pulling up and gripping the wire with their hind paws (test de la traction). Comparable results may be obtained on administration of 1 - [3-[4-(4,5-dihydrothieno[2,3-b][1]benzothiepin - 4-yl)-1-piperazinyl]-propyl]-3-methyl-2-imidazolidinone dihydrochloride. The anesthesia potentiating activity of e.g. 1 - [3 - [4-(4,5-dihydrothieno[2,3-b][1]-benzothiepin - 4 - yl)-1-piperazinyl]propyl]-3-methyl-2-imidazolidinone dihydrochloride and 1-[2-[4-(4,5-dihydrothieno[2,3 - b][1] - benzothiepin-4-yl)-1-piperazinyl]-ethyl] - 3-methyl-2-imidazolidinone bis-methane sulfonate may be demonstrated by subcutaneous administration of respectively about 0.5 to 1.0 and 0.2 to 1.0 mg./kg. of these compounds to mice, anesthetised by intraperitoneal injection of 40 mg./kg. of the short-acting anesthetic N,N-diethyl-2-methoxy-4-allyl-phenoxy acetic acid amide. In both cases, the anesthetic effect of the N,N-diethyl-2-methoxy-4-allyl-phenoxyacetic acid amide is found to be prolonged to a very significant extent. The anti-emetic activity of the compound of the invention as determined in golden hampsters and dogs is very pronounced. The cataleptic activity, determined in rats, is found to be only moderate.

The hypnotic actiyity of the compounds of the present invention may be demonstrated by the observation test in mice [cp. Samuel Irwin, Science 136 ,123–128 (1962)]. In this test an $ED_{50}$ of about 0.5 mg./kg. may be observed on intraperitoneal injection of e.g. 1-[3-[4-(4-(4,5-dihydrothieno[2,3-b][1]benzothiepin-4-yl) - 1 - piperazinyl]-propyl]-3-methyl-2-imidazolidinone dihydrochloride.

The toxicity of the compounds of the invention and their pharmaceutically acceptable acid addition salts as demonstrated in mice on intravenous administration is of favorably low order.

In addition to the two compounds, 1-[2-[4-(4,5-dihydrothieno[2,3-b][1]benzothiepin-4-yl) - 1 - piperazinyl]-ethyl]-3-methyl-2-imidazolidinone and 1-[3-[4-(4,5-dihydrothieno[2,3-b][1]benzothiepin-4-yl) - 1 - piperazinyl]-propyl]-3-methyl-2-imidazolidinone referred to above, which are especially preferred members of the group of compounds of this invention, the following are also of particular interest:

1-[3-[4-(4,5-dihydrothione[2,3-b][1]benzothiepin-4-yl)-1-piperazinyl]-propyl]-3-ethyl-2-amidazolidinone;
1-[2-[4-(4,5-dihydrothieno[2,3-b][1]benzothiepin-4-yl)-1-piperazinyl]-ethyl]-3-ethyl-2-imidazolidinone;
1-[2-[4-(4,5-dihydrothieno[2,3-b][1]benzothiepin-4-yl)-1-piperazinyl]-ethyl]-3-butyl-2-imidazolidinone and
1-[2-[4-(4,5-dihydrothieno[2,3-b][1]benzothiepin-4-yl)-1-piperazinyl]-ethyl]-3-hexyl-2-imidazolidinone, as well as the pharmaceutically acceptable acid addition salts thereof.

In each case as a pharmaceutically acceptable acid addition salt the dihydrochloride is of particular interest and in the case of the 1-[2-]4-(4,5-dihydrothieno[2,3-b][1]benzothiepin - 4 - yl)-1-piperazinyl]-ethyl]-3-methyl-2-imidazolidinone, also the bis-methane sulfonate.

To produce a compound of the Formula I according to the invention, a reactive ester of a compound of the Formula II

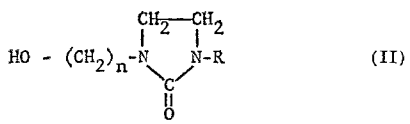

wherein R and $n$ have the meanings given under Formula I, is reacted with 1-(4,5-dihydrothieno[2,3-b][1]benzothiepin-4-yl)piperazine or with an alkali metal derivative thereof and, optionally, the reaction product is converted into an acid addition salt thereof.

Suitable reactive esters of the compounds of Formula II are, e.g. the halides such as the chloride or bromide and also the sulfonic acid esters, such as the methane sulfonic acid ester or the o- or p-toluene sulfonic acid ester.

These esters are reacted with the 4-(1-piperazinyl)-4,5-dihydrothieno[2,3-b][1]benzothiepin preferably in the presence of a solvent. Suitable solvents are those which are inert under the reaction conditions, e.g. hydrocarbons such as benzene or toluene, halogen hydrocarbons such as chloroform, ethereal liquids such as ether or dioxane, lower alkanones such as acetone or methylethyl ketone, as well as phosphoric acid amides, e.g. the triamide of hexamethyl phosphoric acid.

In the reaction, according to the invention, of one molecular equivalent of a reactive ester with one molecular equivalent of a free base, a molecular equivalent of acid is split off. This acid can be bound to excess 4-(1-piperazinyl) - 4,5-dihydrothieno[2,3-b][1]benzothiepin, or also to the dibasic reaction product. Preferably, however, an acid-binding agent is added to the reaction mixture. Suitable acid-binding agents are, e.g. alkali metal carbonates such as sodium or potassium carbonate, also tertiary organic bases such as e.g. pyridine, triethylamine or particularly N,N-diisopropylethylamine. Excess tertiary bases can also be used as solvent.

If, instead of using 4-(1-(piperazinyl)-4,5-dihydrothieno[2,3-b][1]benzothiepin in the reaction according to the invention, an alkali metal derivative of this compound is used, e.g. a sodium, potassium or lithium derivative, then it is advantageous to perform the reaction in a hydrocarbon, e.g. in benzene or toluene.

Of the starting materials embraced by the reactive esters of hydroxy compounds of Formula II, the 1-(2-chloroethyl)- and the 1-(3-chloropropyl)-3-methyl-2-imidazolidinone are known. Further compounds of this type can be produced analogously. The second reaction component, the 4-(1-piperazinyl)-4,5-dihydrothieno[2,3-b][1]benzothiepin, is produced for example as follows: starting with 4 - chloro - 4,5-dihydrothieno[2,3-b][1]benzothiepin, the latter is reacted in benzene with 1-piperazine carboxylic acid ethyl ester to obtain the 4-(4,5-dihydrothieno[2,3-b][1]benzothiepin-4-yl)-1-piperazine carboxylic acid ethyl ester which, with the aid of potassium hydroxide in ethanol, is hydrolysed and decarboxylated.

Applying a second process according to the invention, a compound of the Formula III

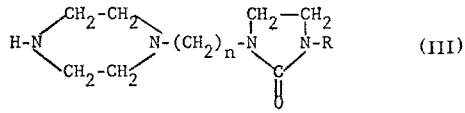

wherein R and $n$ have the meanings given under Formula I, or an alkali metal derivative of such a compound, is reacted with a reactive ester of 4-hydroxy-4,5-dihydrothieno[2,3-b][1]benzothiepin and, optionally, the reaction product is converted into an acid addition salt thereof.

Suitable alkali metal derivatives of compounds of the Formula III are, e.g. sodium, potassium or lithium derivatives. Suitable reactive esters of the 4-hydroxy-4,5-dihydrothieno[2,3-b][1]benzothiepin are, e.g. the halides such as the chloride or bromide, also the sulfonic acid esters such as the methane sulfonic acid ester or the o- or p-toluene suhonic acid ester.

The reaction, according to the invention, of the free bases of the Formula III, or of their alkali metal derivatives, with the reactive esters of the 4-hydroxy-4,5-dihydrothieno[2,3-b][1]benzothiepin, can be performed in the same solvents as mentioned in the first process.

If the free bases are used for the reaction, then the same acid-binding agents can also be used.

The starting materials of the Formula III are described in British patent specification No. 1,081,360. Furthermore, the 4-chloro - 4,5 - dihydrothieno[2,3-b][1]benzothiepin, which is an example for the second reaction component is likewise known. The corresponding 4-bromo-4,5-dihydrothieno[2,3-n][1]benzothiepin can be produced analogously.

Optionally, the compounds of Formula I, obtained as above, are subsequently converted in the usual manner into their addition salts with inorganic and organic acids. For example, to a solution of a compound of the Formula I in an organic solvent is added the acid, desired as the salt component, or a solution thereof. Those organic solvents are referably chosen for the reaction in which the obtained salt is only slightly soluble, so that it can be separted by filtration. Such solvents are, e.g. methanol, acetone, methylethyl ketone, acetone/ethanol, methanol/ether or ethanol/ether.

For use as medicaments it is possible to use, instead of free bases, the pharmaceutically acceptable acid addition salts, i.e. salts with acids, the anions of which are not toxic in the case of the dosages in question. Furthermore, it is of advantage if the salts, used as medicaments, readily crystallise and are not, or are only slightly hygroscopic. For salt formation with compounds of the Formula I, it is possible to use, e.g. hydrochloric acid, hydrobromic acid, sulfuric acid, phosphoric acid, methane sulfonic acid, ethane sulfonic acid, β-hydroxyethane sulfonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid.

The new active substances, as mentioned above, are administered e.g. orally, rectally or parenterally. Dosage amounts depend on the mode of administration, the species, age and weight of the animal and on the condition to be treated. Generally, the daily dosages of the free bases, or of pharmaceutically acceptable acid addition salts thereof, will vary between 0.05 mg./kg. and 10.5 mg./kg. for warm-blooded mammals. Suitable dosage units such as dragées, tablets, suppositories or ampoules, preferably contain 5–200 mg. of an active substance, according to the invention or of a pharmaceutically acceptable salt thereof.

Dosage units for oral administration preferably contain as active substance between 1 and 90% of a compound of the Formula I or of a pharmaceutically acceptable acid addition salt of a such-like compound. They are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, e.g. with concentrated sugar solutions, which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Other suitable dosage units for oral administration are hard gelatine capsules as well as soft, closed capsules made of gelatine and a softener such as glycerin. The hard capsules preferably contain the active substance as a granulate, e.g. in admixture with fillers such as maize starch, and/or lubricants such as talcum or magnesium stearate and, optionally, stabilizers such as sodium metabisulphite ($Na_2S_2O_5$) or ascorbic acid. In soft capsules, the active substance is preferably dissolved or suspended in suitable liquids such as liquid polyethylene glycols, whereby stabliizers can also be added.

Suitable dosage units for rectal administration are e.g. suppositories consisting of a combination of an active substance, or of a suitable salt thereof, with a suppository foundation substance. Suitable as such are, e.g. natural or synthetic triglycerides, paraffin hydrocarbons, polyethylene glycols or higher alkanols. Also suitable are gelatin rectal capsules consisting of a combination of the active substance, or of a suitable salt thereof, and a foundation substance. Examples of the latter are liquid triglycerides, polyethylene glycols or paraffin hydrocarbons.

Ampoules for parenteral, especially intramuscular administration, preferably contain a water-soluble salt of an active substance in a concentration of preferably 0.5 to 5%, optionally together with suitable stabilising agents and buffer substances, in an aqueous solution.

The following examples further illustrate the production of the new compounds of the Formula I and of intermediate products not described hitherto, but the examples in no way limit the scope of the invention. The temperatures are given in degrees centigrade.

EXAMPLE 1

(a) 14.6 g. (0.05 mol) of 1-(4,5-dihydro-thieno[2,3-b][1]benzothiepin-4-yl)-piperazine are dissolved in 100 ml. of methyl ethyl ketone. To this solution are added 13.8 g. (0.1 mol) of potassium carbonate and 10.0 g. (0.06 mol) of 1-(2-chloroethyl)-3-methyl-2-imidazolidinone are added dropwise at 40–50° to the reaction mixture. The mixture is refluxed, while stirring well, for 20 hours. The crude product slowly crystallises out. The suspension is cooled to −10°. The precipitate is then filtered with suction, suspended in water, the suspension stirred, the crude product filtered with suction and then recrystallised from a large amount of acetone. The obtained 1-[2-[4,5-dihydrothieno[2,3 - b][1]benzothiepin - 4 - yl)-1-piperazinyl]-ethyl]-3-methyl-2-imidazolidinone melts at 180–182°.

14.0 g. of the obtained base are dissolved in 100 ml. of hot ethanol and neutralised with 2-molecular equivalents of ethanolic hydrochloric acid. 50 ml. of acetic acid ethyl ester are added and the mixture is cooled to −5°. The hydrochloride, which has crystallised out, is filtered off with suction, washed with a little cold ethanol, dried in vacuo at 100° and is then recrystallised from absolute ethanol. The obtained hydrochloride of the 1-[2-[4-(4,5-dihydrothieno[2,3 - b][1]benzothiepin - 4 - yl)-1-piperazinyl]-ethyl]-3-methyl-2-imidazolidinone melts at 210°.

For the formation of the bis-methane sulfonate salt, 10.7 g. (0.025 mol) of the base are dissolved in a hot mixture of 20 ml. of benzene and 20 ml. of methylethyl ketone and treated with a solution of 4.8 g. (0.05 mol) of methane sulfonic acid in 10 ml. of methylethyl ketone. After the addition of 50 ml. of absolute diethyl ether, the product which crystallises is separated by filtration and recrystallised from ethanol/ethyl acetate. The pure 1-[2-[4 - (4,5 - dihydro-thieno[2,3-b][1]benzothiepin-4-yl)-1-piperazinyl] - ethyl] - 3 - methyl-2-imidazolidinone-bis-methane sulfonate melts at 182–184°.

The starting compound, i.e. the 1-(4,5-dihydrothieno[2,3-b][1]benzothiepin-4-yl)-piperazin is produced as follows:

(b) 12.6 g. (0.05 mol) of 4-chlorothieno[2,3-b][1]benzothiepin are added to a solution of 23.6 g. (0.15 mol) of 1-piperazine carboxylic acid ethyl ester in 20 ml. of benzene. The mixture is refluxed for 5 hours, taken up in 200 ml. of water and 5 ml. of concentrated sodium hydroxide solution and extracted with ether/methylene chloride (2:1). The organic phase is washed four times with water, dried over magnesium sulfate and is then concentrated by evaporation in vacuo. The obtained crude 4-(4,5-dihydrothieno[2,3-b][1]benzothiepin-4-yl)-1-piperazine carboxylic acid ester melts at 118–125° and the pure compound, after recrystallisation from isopropanol/petroleum ether, at 136–138°.

(c) 10.4 g. (0.0278 mol) of the ester, obtained according to (b), are added to a solution of 18 g. (0.316 mol) of potassium hydroxide in 100 ml. of absolute ethanol. The mixture is refluxed for 12 hours, diluted with 50 ml. of water, the ethanol evaporated off in vacuo and the residue extracted with ether/methylene chloride (2:1). The organic phase is dried over magnesium sulfate and concentrated by evaporation in vacuo. The residue is recrystallised from ligroin/acetic acid ethyl ester, whereupon the 1 - (4,5 - dihydrothieno[2,3 - b][1]benzothiepin-4-yl)-piperazin melts at 126–128°.

EXAMPLE 2

(a) 25.0 g. (0.1 mol) of 4 - chloro - 4,5 - dihydrothieno[2,3-b][1]benzothiepin are dissolved in 50 ml. of hexamethylphosphoric acid triamide. To this solution are added 42.0 g. (0.2 mol) of 1-[2-(1-piperazinyl)ethyl]-3-methyl-2-imidazolidinone in 50 ml. of absolute benzene. The solution is heated for 20 hours to 80°, cooled to 20° and poured on to ice. The reaction mixture is extracted with acetic acid ethyl ester and the organic phase extracted six times with 2 N hydrochloric acid. The clear, acid solutions are made alkaline with concentrated ammonia, the precipitated crystals filtered off with suction, washed with water and recrystallised from a large amount of acetone. The obtained 1-[2-[4-(4,5-dihydrothieno[2,3-b][1]benzothiepin - 4 - yl) - 1 - piperazinyl] - ethyl] - 3-methyl-2-imidazolidinone melts at 180–182°.

The same end product can also be obtained as follows:

(b) 10.6 g. (0.05 mol) of 1-[2-(1-piperazinyl)-ethyl]-3-methyl-2-imidazolidinone are dissolved in 50 ml. of absolute benzene, and a solution of 3.2 g. (0.05 mol) of butyl lithium in hexane is added dropwise at 0° thereto. The reaction mixture is brought to room temperature and stirred for 1 hour at 40°. After cooling again to 0°, a solution of 12.6 g. (0.05 mol) of 4-chloro-4,5-dihydrothieno[2,3-b][1]benzothiepin in 40 ml. of absolute benzene is added dropwise during 30 minutes. The reaction mixture is warmed to room temperature within one hour and then refluxed for 4 hours.

The mixture is then poured into 200 ml. of ice water, treated with 25 ml. of 2 N sodium hydroxide solution and shaken out with benzene. The combined benzene extracts are shaken out with 200 ml. of a 1 molar solution of methane sulfonic acid, and the acidic aqueous phase is then alkalized with concentrated sodium hydroxide solution and again extracted with benzene. The resulting benzene extracts are washed with water, dried over magnesium sulfate, and the solvent is removed in vacuo. The resulting residue is recrystalized from benzene/ petroleum ether. The pure 1 - [2 - [4-(4,5-dihydro-thieno[2,3-b][1]benzothiepin - 4 - yl) - 1-piperazinyl]-ethyl]-3-methyl-2-imidazolidinone melts at 180–182°.

The following reaction also yields the same end product:

(c) 11.7 g. (0.05 mol) of 4-hydroxy-4,5-dihydro-thieno[2,3-b][1]benzothiepin and 4.75 g. (0.06 mol) of pyridine are dissolved in 50 ml. of absolute toluene, and during the course of 30 minutes a solution of 5.7 g. (0.05 mol) of methane sulfonic acid chloride in 10 ml. of absolute toluene are added dropwise at −10°. The mixture is stirred for 2 hours at −10° and then added dropwise at 0° to a solution of 21.2 g. (0.1 mol) of 1-[2-(1-piperazinyl)ethyl]-3-methyl-2-imidazolidinone in 50 ml. of absolute benzene. The reaction mixture is then warmed to room temperature during the course of 1 hour and then refluxed for 4 hours.

The mixture is poured into 200 ml. of ice water and processed further as described under (b). The resulting 1 - [2 - [4 - (4,5-dihydro-thieno[2,3-b][1]benzothiepin-4-yl) - 1 - piperazinyl]-ethyl]-3-methyl-2-imidazolidinone is identical to the product obtained under (a) and (b) and melts at 180–182°.

EXAMPLE 3

9.5 g. (0.03 mole) of 1-(4,5-dihydrothieno[2,3-b][1]benzothiepin-4-yl)-piperazin are refluxed with 6.35 g. (0.036 mole) of 1-(3-chloropropyl)-3-methyl-2-imidazolidinone and 8.3 g. (0.06 mol) of potassium carbonate for 36 hours in 70 ml. of diethyl ketone. The reaction mixture is then poured on to 200 ml. of ice water, 40 ml. of 2 N sodium hydroxide solution are added and the mixture is extracted with chloroform. The organic extract is washed with water, dried over magnesium sulfate, and concentrated by evaporation in vacuo.

The crude base is dissolved in 50 ml. of acetone and ethereal hydrochloric acid is added to the acetone solution until an acid reaction is shown on congo paper. The crude dihydrochloride, which precipitates, is filtered, washed with acetone and also with ether, and dried in vacuo. After recrystallisation of the crude product from 96% ethanol/ether, the pure 1-[3-[4-(4,5-dihydrothieno[2,3-b][1]benzothiepin-4-yl) - 1 - piperazinyl]-propyl]-3-methyl-2-imidazolidinone dihydrochloride, M.P. 189–192°, is obtained.

EXAMPLE 4

(a) 12.05 g. (0.04 mol) of 1-(4,5-dihydrothieno[2,3-b][1]benzothiepin-4-yl)-piperazin and 9.15 g. (0.048 mol) of 1-(3-chloropropyl)-3-ethyl-2-imidazolidinone are dissolved in 100 ml. of diethyl ketone and 11.0 g. (0.08 mol) of potassium carbonate added. The reaction mixture is refluxed for 24 hours, poured on to 200 ml. of ice water and 50 ml. of 2 N sodium hydroxide solution are added. The organic phase is separated and the aqueous alkaline solution extracted with ether/methylene chloride (2:1). The organic solutions are combined, washed with water and extracted with 250 ml. of molar methane sulfonic acid solution. The acid extract is made alkaline with concentrated sodium hydroxide solution and the precipitated, crude base shaken out with 200 ml. of ether/methylene chloride (2:1). The extract is washed with water, dried over magnesium sulfate and concentrated by evaporation in vacuo.

The residue is dissolved in 50 ml. of acetone, 150 ml. of absolute ether are added and the dihydrochloride is precipitated with ethereal hydrochloric acid. The dihydrochloride is filtered off, washed with acetone and ether, dried in vacuo and recrystallised from 96% ethanol/ether. The obtained pure 1-[3-[4-(4,5-dihydrothieno[2,3-b][1]benzothiepin-4-yl)-1-piperazinyl]-propyl] - 3 - ethyl-2-imidazolidinone dihydrochloride melts at 175–177°.

The 1-(3-chloropropyl)-3-ethyl-2-imidazolidinone, used as starting material, is produced as follows:

(b) 60.0 g. (0.52 mol) of 3-ethyl-2-oxazolidinone and 68.1 g. (0.57 mol) of (3-chloropropyl)-isocyanate are mixed with 4.8 g. of lithium chloride and the mixture is heated for 90 minutes to 175–180°. The reaction mixture is cooled and 300 ml. of chloroform are added. The chloroform solution is separated, washed three times with, each time, 30 ml. of saturated sodium chloride solution, dried over magnesium sulfate and concentrated by evaporation in vacuo. The residue is distilled under high vacuum and the pure 1-(3-chloropropyl)-3-ethyl-2-imidazolidinone, B.P. 105–110°/0.01 torr; $n_D^{24°}$: 1.4889, is obtained.

EXAMPLE 5

(a) Analogously to Example 4(a) is obtained the following end product: from 10.6 g. (0.035 mol) of 1-(4,5-dihydrothieno[2,3-b][1]benzothiepin-4-yl)-piperazin and 7.4 g. (0.042 mol) of 1-(2-chloroethyl)-3-ethyl-2-imidazolidinone is obtained the 1-[2-[4-(4,5-dihydrothieno[2,3-b][1]benzothiepin-4-yl)-1-piperazinyl]-ethyl] - 3 - ethyl-2-imidazolidinone, M.P. 122–124°; dihydrochloride M.P. 187–189°.

(b) 115 g. (1.0 mol) of 3-ethyl-2-oxazolidinone and 116 g. (1.1 mol) of (2-chloroethyl)-isocyanate are mixed with 10.0 g. of lithium chloride and heated from 2 hours to 180°. The reaction mixture is cooled, 300 ml. of chloroform are added and the mixture is extracted three times using 30 ml. of saturated sodium chloride solution each time. The organic phase is dried over magnesium sulfate and concentrated by evaporation in vacuo. The oily residue is distilled under high vacuum. The obtained pure 1-(2-chloroethyl)-3-ethyl-2-imidazolidinone boils at 95°/0.01 torr; $n_D^{24°}$: 1.4913.

EXAMPLE 6

Analogously to Example 4(a), the following end product is obtained:

From 12.8 g. (0.04 mol) of 1-(4,5-dihydro-thieno[2,3-b][1] - benzothiepin - 4 - yl)-piperazine and 9.8 g. (0.048 mol) of 1 - (2 - chloroethyl) - 3-butyl-2-imidazolidinone there is obtained 1 - [2 - [4-(4,5-dihydro-thieno[2,3-b][1]benzothiepin - 4 - yl) - 1 - piperazinyl]-ethyl]-3-butyl-2-imidazolidinone, the dihydrochloride sesquihydrate of which melts at 191–193°.

EXAMPLE 7

(a) Analogously to Example 4(a), the following end product is obtained:

From 12.8 g. (0.04 mol) of 1-(4,5-dihydro-thieno-[2,3-b][1]benzothiepin-4-yl) - 1 - piperazine and 11.2 g. (0.048 mol) of 1-(2-chloroethyl)-3-n-hexyl-2-imidazolidinone, the 1-[2-[4-(4,5-dihydro-thieno[2,3-b][1]benzothiepin-4-yl)-1-piperazinyl]-ethyl] - 3-n-hexyl-2-imidazolidinone having a melting point of 93–95°, dihydrochloride 192–195°.

The 1-(2-chloroethyl)-3-n-hexyl - 2 - imidazolidinone, used as starting material, is produced as follows:

(b) 77.6 g. (0.5 mol) of n-hexylamino-ethanol with 65.0 g. (0.55 mol) of diethyl carbonate and 1 g. of sodium are slowly heated to reflux temperature. The ethanol liberated during the reaction is continuously distilled over a column for a period of 2 hours. The residue is rectified in high vacuum. The pure 3-n-hexyl-2-oxazolidinone boils at 100°/0.005 torr, $n_D^{20}$=1.4564.

(c) 51.3 g. (0.3 mol) of the product obtained according to (b) are heated for about 2 hours at 180° with 34.8 g. (0.33 mol) of (2-chloroethyl)-isocyanate and 2.4 g. of lithium chloride. After cooling, the reaction mixture with the addition of 30 ml. of saturated sodium chloride solution is shaken out with 300 ml. of chloroform. The organic phase is dried over magnesium sulfate, the solvent is removed in vacuo and the residue is rectified in high vacuum. The resultant, pure 1-(2-chloroethyl)-3- n-hexyl-2-imidazolidinone boil at 121–127°/0.02 torr, $n_D^{25}=1.4818$.

EXAMPLE 8

(a) Analogously to Example 2, from 12.6 g. (0.05 mol) of 4-chloro-4,5-dihydro-thieno[2,3-b][1]benzothiepin and 25.4 g. (0.1 mol) of 1-[2-(1-piperazinyl)-ethyl]-3-butyl-2-imidazolidinone there is produced the 1-[2-[4-(4,5-dihydro-thieno[2,3-b][1]benzothiepin - 4 - yl)-1-piperazinyl]-ethyl]-3-butyl-2-imidazolidinone - dihydrochloride-sesquihydrate, M.P. 191–193°.

The 1-[2-(1-piperazinyl)-ethyl]-3-butyl - 2 - imidazolidinone required as starting material is obtained as follows:

(b) 40.4 g. (0.2 mol) of 1-(2-chloroethyl)-3-butyl-2-imidazolidinone are dissolved with 35.0 g. (0.22 mol) of carbethoxypiperazine in 200 ml. of diethyl ketone and, with the addition of 55.3 g. (0.4 mol) of finely powdered potassium carbonate, are refluxed for 24 hours, cooled and filtered. The residue is extracted by boiling twice with 200 ml. each of chloroform and filtered.

The combined filtrates are concentrated to dryness in vacuo, and the oily residue is distilled in high vacuum. The pure 1-[2-(N-carbethoxy-piperazinyl)ethyl]-3-butyl-2-imidazolidinone boils at 190–192°/0.01 torr, $n_D^{24}=1.4941$.

(c) 54.0 g. (0.164 mol) of 1-[2-(N-carbethoxy-piperazinyl)-ethyl]-3-butyl-2-imidazolidinone are refluxed for 16 hours with a solution of 60 g. of potassium hydroxide in 300 ml. of absolute ethanol. The resulting precipitate is filtered and rinsed with hot ethanol. The combined filtrates are then concentrated to dryness. The residue is taken up in 300 ml. of benzene and 100 ml. of water; after separation, the aqueous phase is saturated with potassium carbonate and extracted 4 times with benzene. The combined benzene solutions are dried over potassium carbonate and freed of solvent in vacuo. The residue is distilled in high vacuum, whereby the pure 1-[2-(1-piperazinyl)-ethyl]-3-butyl - 2 - imidazolidinone passes over at 155–160°/0.01 torr; $n_D^{24}=1.5033$.

EXAMPLE 9

Analogously to Example 2, from 12.6 g. (0.05 mol) of 4-chloro-4,5-dihydro-thieno[2,3 - b][1]benzothiepin and 28.2 g. (0.1 mol) of 1-[2-(1-piperazinyl)-ethyl]-3-n-hexyl-2-imidazolidinone, there is obtained.

1-[2-[4-(4,5-dihydro-thieno[2,3 - b][1]benzothiepin-4-yl)-1-piperazinyl]-ethyl]-3 - n - hexyl-2-imidazolidinone, M.P. 92–95°, dihydrochloride 192–195°.

The imidazolidinone derivative required as starting material is obtained analogously to Examples 8(b) and (c).

EXAMPLE 10

250 g. of 1-[2-[4-(4,5-dihydrothieno[2,3-b][1]benzothiepin-4-yl)-1-piperazinyl] - ethyl]-3-methyl-2-imidazolidinone are mixed with 175.80 g. of lactose and 169.70 g. of potato starch. The mixture is moistened with an alcoholic solution of 10 g. of stearic acid and is then granulated through a sieve. After drying, 160 g. of potato starch, 200 g. of talcum, 2.50 g. of magnesium stearate and 32 g. of colloidal silicon dioxide are mixed in. The obtained mixture is pressed into 10,000 tablets each weighing 100 mg. and each containing 25 mg. of active substance. Optionally, the tablets can be provided with grooves for more accurate adjustment of the dosage amount.

EXAMPLE 11

A granulate is produced from 250 g. of 1-[2-[4-(4,5-dihydrothieno[2,3 - b][1]benzothiepin-4-yl)-1-piperazinyl]-ethyl]-3-methyl-2-imidazolidinone, 175.90 g. of lactose and an alcoholic solution of 10 g. of stearic acid. After drying, the granulate is mixed with 56.60 g. of colloidal silicon dioxide, 165 g. of talcum, 20 g. of potato starch and 2.50 g. of magnesium stearate, the mixture then being pressed into 10,000 dragée cores. These are subsequently coated with a concentrated syrup made from 502.28 g. of crystallised saccharose, 6 g. of shellac, 10 g. of gum arabic, 0.22 g. of dyestuff and 1.5 g. of titanium dioxide, and dried. The obtained dragées each weigh 120 mg. and each contain 25 mg. of active substance.

EXAMPLE 12

To produce 1000 capsules each containing 25 mg. of active substance, 25 g. of 1-[3-[4-(4,5-dihydrothieno[2,3-b][1]benzothiepin - 4 - yl) - 1 - piperazinyl]propyl]-3-methyl-2-imidazolidinone are mixed with 248.0 g. of lactose. The mixture is evenly moistened with an aqueous solution of 2.0 g. of gelatine and granulated through a suitable sieve (e.g. Sieve III, Ph. Helv. V). The granulate is mixed with 10.0 g. of dried maize starch and 15.0 g. of talcum and the obtained mixture is uniformly filled into 1000 hard gelatine capsules, size 1.

EXAMPLE 13

A suppository foundation mixture is prepared from 2.5 g. of 1 - [3-[4-(4,5-dihydrothieno[2,3-b][1]benzothiepin-4 - yl)-1-piperazinyl]-propyl]-3-methyl-2-imidazolidinone and 167.5 g. of adeps solidus. From this mixture are then filled 100 suppositories each containing 25 mg. of active substance.

EXAMPLE 14

A solution of 25 g. of 1-[2-[4-(4,5-dihydrothieno[2,3-b][1]benzothiepin-4-yl) - 1 - piperazinyl]-ethyl]-3-methyl-2-imidazolidinone dihydrochloride in one litre of water is filled into 1000 ampoules and sterilised. An ampoule contains a 2.5% solution of 25 mg. of active substance.

What is claimed is:

1. A compound of the formula

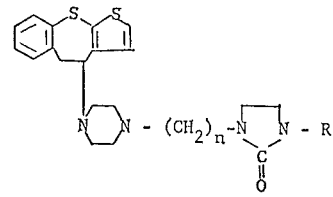

wherein

R is alkyl having from 1 to 6 carbon atoms and $n$ is 2 or 3 and the pharmaceutically acceptable acid addition salts thereof.

2. A compound according to claim 1, wherein R is methyl and $n$ is 2 and the hydrochloride and bis-methane sulfonate thereof.

3. A compound according to claim 1, wherein R is methyl and $n$ is 3 and the dihydrochloride thereof.

4. A compound according to claim 1, wherein R is ethyl and $n$ is 2 and the dihydrochloride thereof.

5. A compound according to claim 1, wherein R is ethyl and $n$ is 3.

6. A compound according to claim 1, wherein R is butyl and $n$ is 2 and the dihydrochloride sesquihydrate thereof.

7. A compound according to claim 1, wherein R is hexyl and $n$ is 2 and the dihydrochloride thereof.

References Cited

UNITED STATES PATENTS

| | | | |
|---|---|---|---|
| 3,196,152 | 7/1965 | Wright et al. | 260—268 X |
| 3,374,237 | 3/1968 | Wright et al. | 260—268 |
| 3,487,085 | 12/1969 | Protiva et al. | 260—268 |

FOREIGN PATENTS

| | | | |
|---|---|---|---|
| 1,081,360 | 8/1967 | Great Britain | 260—268 TR |

DONALD G. DAUS, Primary Examiner

U.S. Cl. X.R.

260—268 H, 309.7; 424—250